(12) United States Patent
Cheng et al.

(10) Patent No.: US 10,992,152 B2
(45) Date of Patent: Apr. 27, 2021

(54) UNINTERRUPTIBLE POWER SUPPLY AND METHOD OF OPERATING THE SAME

(71) Applicant: DELTA ELECTRONICS, INC., Taoyuan (TW)

(72) Inventors: Chung-Chieh Cheng, Taoyuan (TW); Yung-Sheng Yan, Taoyuan (TW); Chao-Chin Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 329 days.

(21) Appl. No.: 16/238,139

(22) Filed: Jan. 2, 2019

(65) Prior Publication Data
US 2020/0067339 A1 Feb. 27, 2020

(30) Foreign Application Priority Data
Aug. 24, 2018 (CN) .......................... 201810971639.2

(51) Int. Cl.
| | |
|---|---|
| *H01M 10/44* | (2006.01) |
| *H01M 10/46* | (2006.01) |
| *H02J 7/00* | (2006.01) |
| *H02J 9/06* | (2006.01) |
| *H02M 3/04* | (2006.01) |

(52) U.S. Cl.
CPC ............ *H02J 7/0068* (2013.01); *H02J 9/062* (2013.01); *H02M 3/04* (2013.01)

(58) Field of Classification Search
CPC .. H02J 7/02; H02J 7/0068; H02J 9/062; H02J 9/061; H02J 2207/10; H02J 2207/20; H02J 7/0019; H02J 7/0021; H02J 7/0022; H02J 7/0027

USPC ....... 320/103, 107, 116, 121, 128, 135, 137, 320/138; 307/64, 66
See application file for complete search history.

(56) References Cited

U.S. PATENT DOCUMENTS

| | | | | |
|---|---|---|---|---|
| 2008/0067872 | A1* | 3/2008 | Moth ..................... | H02J 9/062 307/23 |
| 2011/0044077 | A1* | 2/2011 | Nielsen ............... | H02M 5/4585 363/37 |
| 2012/0086276 | A1* | 4/2012 | Sawyers ................... | H02J 1/12 307/66 |
| 2013/0026835 | A1* | 1/2013 | Ghosh ..................... | H02M 1/10 307/66 |

* cited by examiner

*Primary Examiner* — Edward Tso
(74) *Attorney, Agent, or Firm* — Muncy, Geissler, Olds & Lowe, P.C.

(57) ABSTRACT

An uninterruptible power supply includes a switching unit, a charging unit, an energy storage unit, a conversion unit, and a control unit. When an input power source is available, the switching unit provides a first output power source and the charging unit converts the input power source into a first power source to provide the first power source to the control unit and to charge the energy storage unit. When the input power source is not available, the conversion unit converts the electricity of the energy storage unit into a second output power source and provides the second output power source. When the input power source is not available, the conversion unit provides a second power source to the charging unit so that the charging unit converts the second power source into the first power source and provides the first power source to the control unit.

14 Claims, 5 Drawing Sheets

UNINTERRUPTIBLE POWER SUPPLY AND METHOD OF OPERATING THE SAME

BACKGROUND

Technical Field

The present disclosure relates to an uninterruptible power supply and a method of operating the same, and more particularly to an uninterruptible power supply having less circuit components.

Description of Related Art

The statements in this section merely provide background information related to the present disclosure and do not necessarily constitute prior art.

As the growing development of technology, the demand of power quality for electrical apparatuses is getting higher and higher. In order to ensure the safety of electrical apparatuses, the uninterruptible power supply is highly regarded. Also, in order to meet the demand of using the uninterruptible power supply, the cost reduction and volume reduction thereof are gradually developed.

Please refer to FIG. 1, which shows a schematic block diagram of an uninterruptible power supply according to the related art. The uninterruptible power supply 100A includes a switching unit 10A, a charging unit 20A, an energy storage unit 30A, a conversion unit 40A, a switching power supply SPS, and a control unit 50A. When an input power source Vin is available, the charging unit 20A receives the input power source Vin and converts the input power source Vin to charge the energy storage unit 30A. At this condition, the switching power supply SPS receives the power source outputted from the charging unit 20A and converts the power source outputted from the charging unit 20A to supply the control unit 50A. When the input power source Vin is not available, the switching power supply SPS receives the power source outputted from the energy storage unit 30A and converts the power source outputted from the energy storage unit 30A to supply the control unit 50A.

In general, a further conversion stage, i.e., the switching power supply SPS is necessary to be used between the energy storage unit 30A and the control unit 50A so as to provide a stable working power source that meets the normal operation requirements of the control unit 50A. However, the volume and the circuit costs of the uninterruptible power supply cannot be reduced as well as the conversion losses increases and the efficiency reduces due to the further conversion stage.

SUMMARY

In order to solve the above-mentioned problems, the present disclosure provides an uninterruptible power supply. The uninterruptible power supply includes an input end receiving an input power source and an output end coupled to a load. The uninterruptible power supply includes a switching unit, a charging unit, an energy storage unit, a conversion unit, and a control unit. The switching unit is coupled to the input end and the output end. The charging unit is coupled to the input end. The energy storage unit is coupled to the charging unit. The conversion unit is coupled to the charging unit, the energy storage unit, and the output end. The control unit is coupled to the charging unit. When the input power source is available, the switching unit switches the input power source into a first output power source and provides the first power source to the output end, and the charging unit converts the input power source into a first power source and provides the first power source to the control unit and to charge the energy storage unit. When the input power source is not available, the conversion unit converts the electricity of the energy storage unit into a second output power source and provide the second output power source to the output end, and the conversion unit provides a second power source to the charging unit and the charging unit converts the second power source into the first power source and provides the first power source to the control unit.

In order to solve the above-mentioned problems, the present disclosure provides a method of operating an uninterruptible power supply. The uninterruptible power supply receives an input power source and provides a first output power source or a second output power source to a load. The uninterruptible power supply includes a switching unit, a charging unit, an energy storage unit, a conversion unit, and a control unit. The method includes the steps of: switching, by the switching unit, the input power source into the first output power source when the input power source is available; converting, by the charging unit, the input power source into a first power source and providing the first power source to the control unit and to charge the energy storage unit when the input power source is available; converting, by the conversion unit, the electricity of the energy storage unit into a second output power source when the input power source is not available, and converting, by the conversion unit, the electricity of the energy storage unit into a second power source and providing the second power source to the charging unit, and converting, by the charging unit, the second power source into a first power source and providing the first power source to the control unit when the input power source is not available.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
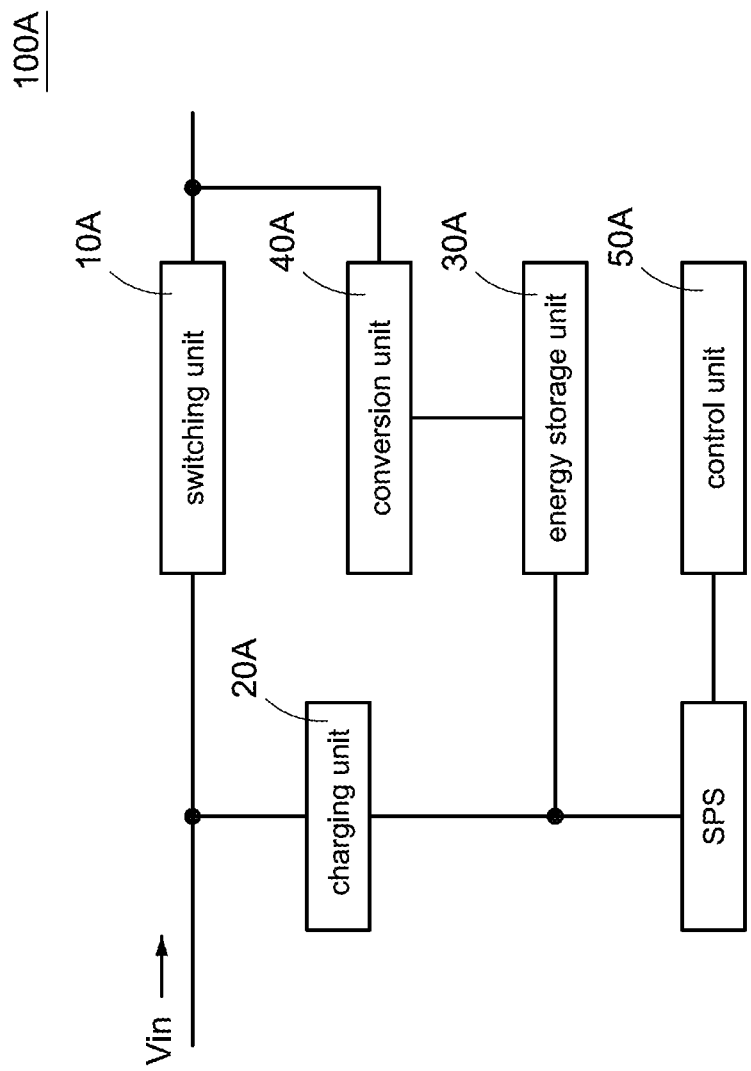
FIG. 1 is a schematic block diagram of an uninterruptible power supply according to the related art.

Reference will now be made to the drawing figures to describe the present disclosure in detail. It will be understood that the drawing figures and exemplified embodiments of present disclosure are not limited to the details thereof.

Figure 2:
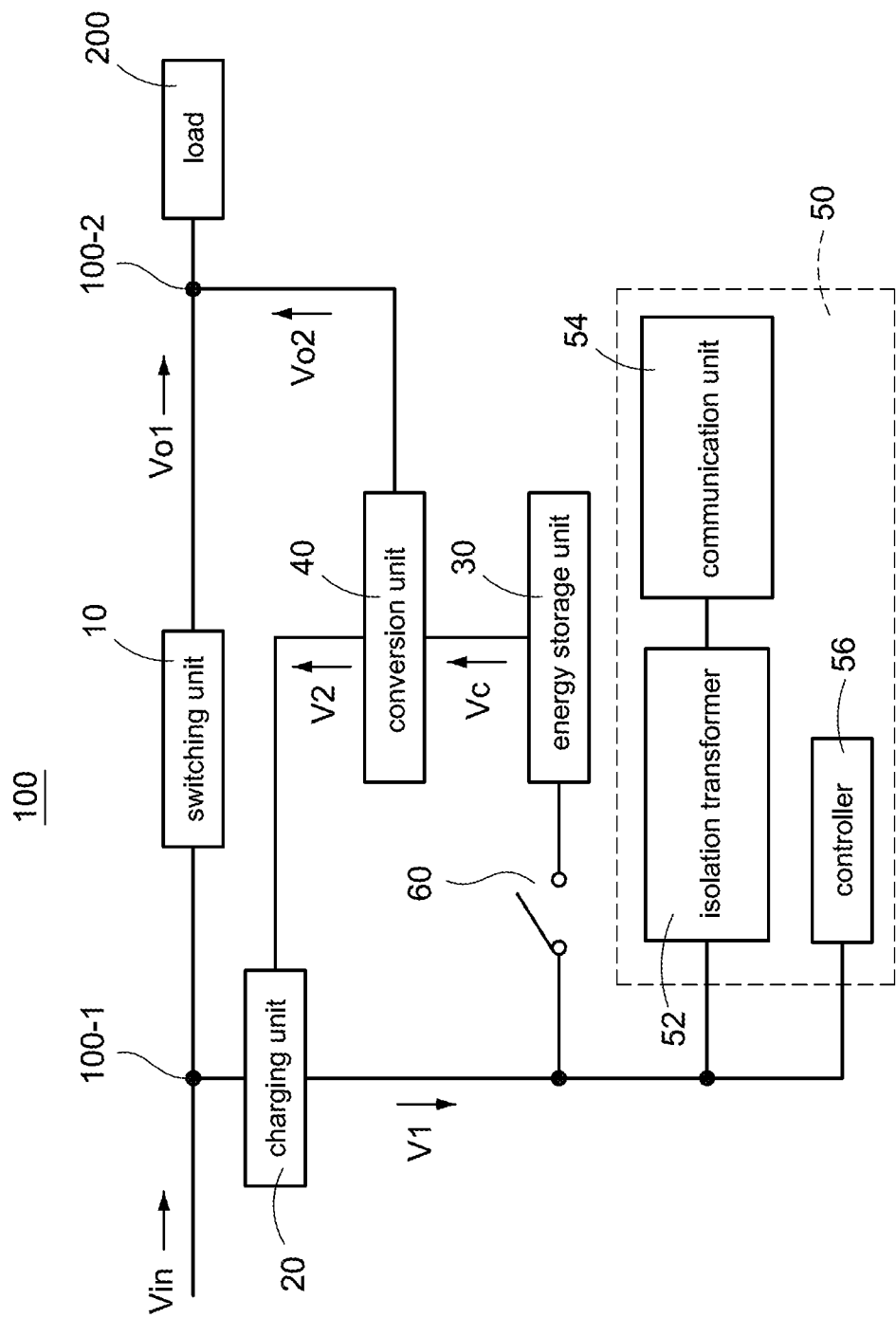
FIG. 2 is a schematic block diagram of an uninterruptible power supply according to the present disclosure.

Please refer to FIG. 2, which shows a schematic block diagram of an uninterruptible power supply according to the present disclosure. The uninterruptible power supply 100 has an input end 100-1 and an output end 100-2, and the input end 100-1 receives an input power source Vin and the output end 100-2 is coupled to a load 200. The uninterruptible power supply 100 includes a switching unit 10, a charging unit 20, an energy storage unit 30, a conversion unit 40, and a control unit 50. One end of the switching unit 10 is coupled to the input end 100-1 and the other end of the switching unit 10 is coupled to the output end 100-2. One end of the charging unit 20 is coupled to the input end 100-1 and the other end of the charging unit 20 is coupled to the energy storage unit 30 and the control unit 50. A first end of the conversion unit 40 is coupled to the output end 100-2 and a second end of the conversion unit 40 is coupled to the energy storage unit 30. In addition, a third end of the conversion unit 40 is coupled to the charging unit 20 and provides a second power source V2 to the charging unit 20. The detailed description of the connection between the conversion unit 40 and the charging unit 20 and the opportunity of providing the second power source V2 will be made as follows.

When the input power source Vin is available, the switching unit 10 receives the input power source Vin and provides a first output power source Vo1 to the output end 100-2 according to the input power source Vin so that the uninterruptible power supply 100 provides the first output power source Vo1 for supplying the required electricity to the load 200. At this condition, the charging unit 20 receives the input power source Vin, converts the input power source Vin into a first power source V1, and outputs the first power source V1 to charge the energy storage unit 30. Also, the first power source V1 outputted from the charging unit 20 is provided to the control unit 50 for supplying the required electricity to the control unit 50. Moreover, if the magnitude of the first power source V1 is improper to supply a controller 56 (as shown in FIG. 2) of the control unit 50, for example, the magnitude of the first power source V1 is significantly greater than a working voltage of the controller 56, a step-down circuit, such as a low-dropout regulator (LDO) is required to receive the first power source V1 and step down the magnitude of the first power source V1 for properly supplying the controller 56.

When the input power source Vin is not available, the energy storage unit 30 provides an energy storage power source Vc to the conversion unit 40. In particular, the energy storage power source Vc is the electricity stored in the energy storage unit 30 when the input power source Vin is available. The conversion unit 40 converts the energy storage power source Vc into a second output power source Vo2 and provides the second output power source Vo2 to the output end 100-2 so that the uninterruptible power supply 100 provides the second output power source Vo2 for supplying the required electricity to the load 200. At this condition, the conversion unit 40 provides the second power source V2 to the charging unit 20 through the third end of the conversion unit 40, and the charging unit 20 converts the second power source V2 into the first power source V1 and provides the first power source V1 to the control unit 50 for supplying the required electricity to the control unit 50.

The uninterruptible power supply 100 further includes a switch unit 60, and one end of the switch unit 60 is coupled to the charging unit 20 and the other end of the switch unit 60 is coupled to the energy storage unit 30. When the switch unit 60 detects that the input power source Vin is available, the switch unit 60 is turned on to make the first power source V1 charge the energy storage unit 30 through the switch unit 60. When the switch unit 60 detects that the input power source Vin is not available, the switch unit 60 is turned off. At this condition, a path between the charging unit 20 and the energy storage unit 30 is disconnected so that the first power source V1 outputted from the charging unit 20 fails to charge the energy storage unit 30. In one embodiment, it is to control whether the switch unit 60 is turned on by detecting whether the input power source Vin is available or not and providing a control signal by the control unit 50.

The control unit 50 includes an isolation transformer 52, a communication unit 54, and a controller 56. The controller 56 is provided to control the uninterruptible power supply 100 normally operating. A user may set operation modes of the uninterruptible power supply 100 by the communication unit 54 or the uninterruptible power supply 100 is communicated with other electronic apparatuses through the communication unit 54. One end of the isolation transformer 52 is coupled to the charging unit 20 and the other end of the isolation transformer 52 is coupled to the communication unit 54 so that the first power source V1 provided from the charging unit 20 to the communication unit 54 through the isolation transformer 52 for supplying the required electricity to the communication unit 54. The controller 56 is coupled to the charging unit 20 so that the first power source V1 provided from the charging unit 20 for supplying the required electricity to the controller 56. The communication unit 54 is usually disposed outside the uninterruptible power supply 100, such as but not limited to the surface of an outer casing of the uninterruptible power supply 100. The isolation transformer 52 with electrical isolation between a primary side and a secondary side thereof is used to protect the user manipulating the uninterruptible power supply 100. The controller 56 is usually disposed inside the uninterruptible power supply 100 and provides control signals to control different circuit units of the uninterruptible power supply 100 being in the normal operation. In generally, an additional isolation transformer coupled to the controller 56 is not required since the controller 56 is hardly touched by the user. In practical applications, however, the additional isolation transformer may be used according to the actual requirement of using the uninterruptible power supply 100.

Furthermore, when the input power source Vin is not available, the required electricity of the control unit 50 and the load 200 is provided from the energy storage unit 30. Since the electricity of the energy storage unit 30 consumes continuously, a voltage value of the energy storage power source Vc gradually reduces. It would be possible that the reduction of the energy storage power source Vc fails to maintain the control unit 50 normally working if the energy storage power source Vc provided from the energy storage unit 30 directly supplies power to the control unit 50. Therefore, the energy storage power source Vc is converted by the conversion stage, i.e., the conversion unit 40 and the charging unit 20 to stabilize a voltage value of the power source, i.e., the first power source V1 received by the control unit 50.

Figure 3A:
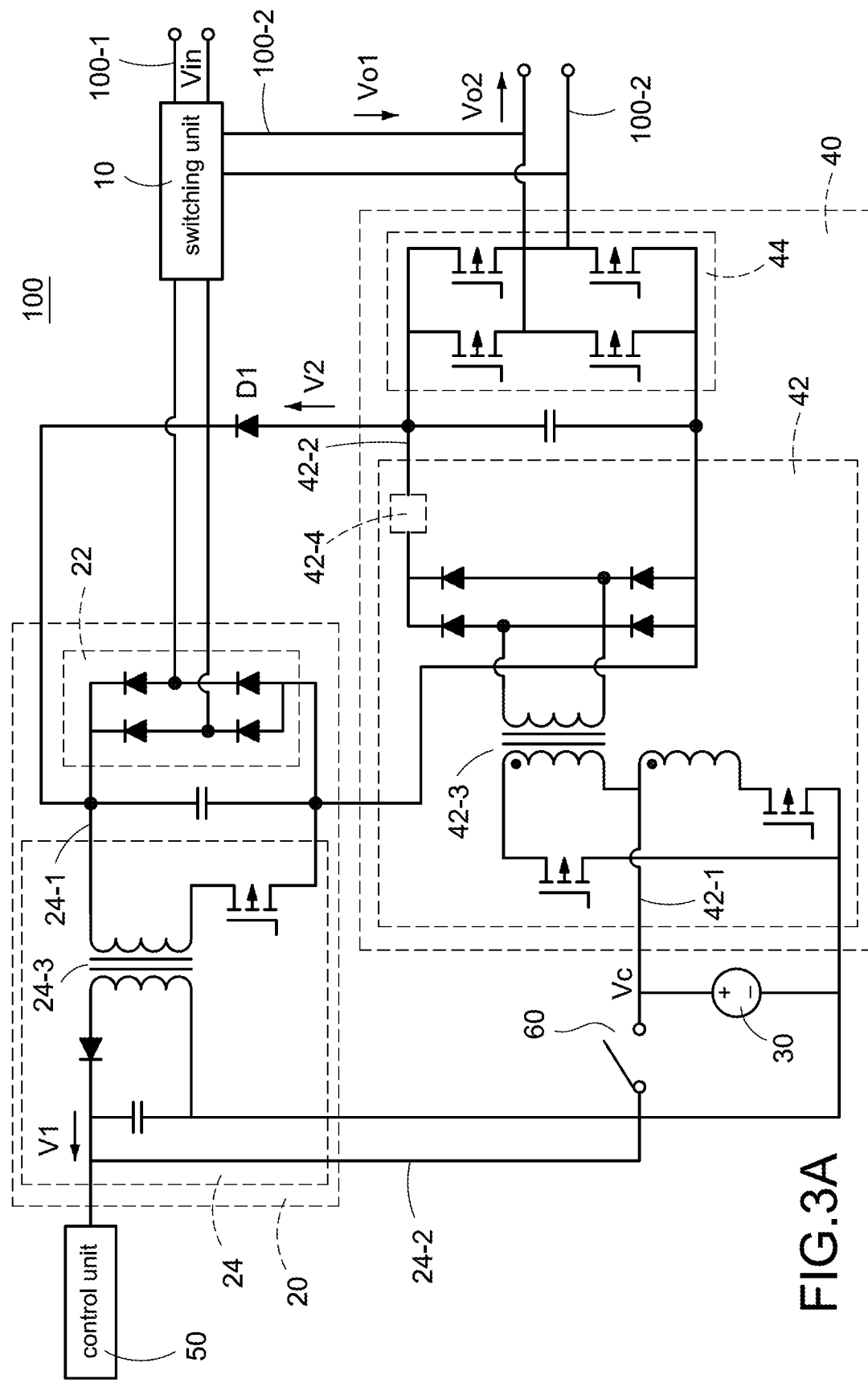
FIG. 3A is a circuit diagram of the uninterruptible power supply according to a first embodiment of the present disclosure.

Please refer to FIG. 3A, which shows a circuit diagram of the uninterruptible power supply according to a first embodiment of the present disclosure, and also refer to FIG. 2. In one embodiment, the uninterruptible power supply 100 is an AC-in/AC-out uninterruptible power supply, and the switching unit 10 is a switch component. When the input power source Vin is available, the switching unit 10 is turned on so that the input power source Vin is the first output power source Vo1, and the input power source Vin is provided to the load 200 through the output end 100-2. When the input power source Vin is not available, the switching unit 10 is turned off so that the energy storage power source Vc provided from the energy storage unit 30 is converted by the conversion unit 40 into the second output power source Vo2 to supply the load 200 through the output end 100-2. Accordingly, the load 200 can obtain the required power supply wherever the input power source Vin is available or not available.

The charging unit 20 includes a first rectifying unit 22 and a first DC conversion unit 24. One end of the first rectifying unit 22 is coupled to the input end 100-1 and the other end of the first rectifying unit 22 is coupled to the first DC conversion unit 24. The first DC conversion unit 24 has a first input side 24-1, a first output side 24-2, and a first transformation component 24-3. The first input side 24-1 is coupled to the first rectifying unit 22 and the conversion unit 40, and the first output side 24-2 is coupled to the control unit 50 and coupled to the energy storage unit 30 through the switch unit 60. The first transformation component 24-3 is coupled between the first input side 24-1 and the first output side 24-2 to convert the electricity energy from the first input side 24-1 to the first output side 24-2 in an electromagnetic coupling manner. In one embodiment, the first DC conversion unit 24 is a flyback converter for converting a power source with a high-voltage, such as but not limited to 180 volts into a power source with a low-voltage, such as but not limited to 12 volts, and the first transformation component 24-3 thereof is used to provide the electrical isolation between the high voltage and the low voltage. Therefore, different DC converters known in the art should be included in the scope of the present disclosure.

After the first rectifying unit 22 rectifies the input power source Vin, the rectified input power source Vin is provided to the first input side 24-1 of the first DC conversion unit 24. The first DC conversion unit 24 converts the rectified input power source Vin into the first power source V1 and outputs the first power source V1 through the first output side 24-2. Alternatively, the first DC conversion unit 24 converts the second power source V2, which is produced by converting the energy storage power source Vc outputted form the energy storage unit 30 by the conversion unit 40, into the first power source V1 and outputs the first power source V1 through the first output side 24-2.

When the input power source Vin is available, the switch unit 60 is turned on. The first DC conversion unit 24 converts the rectified input power source Vin into the first power source V1 and outputs the first power source V1 through the first output side 24-2. The first power source V1 is provided to the control unit 50 through the first output side 24-2 and provided to charge the energy storage unit 30 through the switch unit 60.

When the input power source Vin is not available, the switch unit 60 is turned off so that a path between the first output side 24-2 and the energy storage unit 30 is disconnected. The first DC conversion unit 24 converts the second power source V2 into the first power source V1 and outputs the first power source V1 through the first output side 24-2. The first power source V1 is provided to the control unit 50 through the first output side 24-2 but fails to charge the energy storage unit 30.

The conversion unit 40 includes a second DC conversion unit 42 and an inverter unit 44. The second DC conversion unit 42 has a second input side 42-1, a second output side 42-2, and a second transformation component 42-3. The second input side 42-1 is coupled to the energy storage unit 30, and the second output side 42-2, i.e., the third end of the conversion unit 40 shown in FIG. 1, is coupled to one end of the inverter unit 44 and the first input side 24-1 of the first DC conversion unit 24. The other end of the inverter unit 44 is coupled to the output end 100-2. The second transformation component 42-3 is coupled between the second input side 42-1 and the second output side 42-2 to convert the electricity energy from the second input side 42-1 to the second output side 42-2 in an electromagnetic coupling manner.

When the input power source Vin is not available, the second DC conversion unit 42 converts the energy storage power source Vc provided from the energy storage unit 30 into the second power source V2, and provides the second power source V2 to the first input side 24-1 and the inverter unit 44 through the second output side 42-2. The inverter unit 44 inverts the second power source V2 into the second output power source Vo2 and provides the second output power source Vo2 to the load 200 through the output end 100-2. In one embodiment, a diode D1 is connected between the second output side 42-2 and the first input side 24-1 so that the power does not flow from the first input side 24-1 to the second output side 42-2. In one embodiment, the second DC conversion unit 42 is a push-pull converter for converting a power source with a low-voltage, such as but not limited to 12 volts into a power source with a high-voltage, such as but not limited to 180 volts, and the second transformation component 42-3 thereof is used to provide the electrical isolation between the high voltage and the low voltage. Moreover, different DC converters known in the art should be included in the scope of the present disclosure.

The second DC conversion unit 42 further has a filtering component 42-4, expressed as a dash box, and the filtering component is, for example but not limited to, an inductor. The filtering component 42-4 is coupled between the second transformation component 42-3 and the second output side 42-2 and filters the second power source V2. If the filtering component 42-4 is absent, the second DC conversion unit 42 converts the direct-current energy storage power source Vc into a unipolar square-wave second power source V2, and the second output side 42-2 provides the unipolar square-wave second power source V2 to the first input side 24-1 and the inverter unit 44. The inverter unit 44 inverts the unipolar square-wave second power source V2 into a bipolar square-wave second output power source Vo2 and provides the bipolar square-wave second output power source Vo2 to the output end 100-2. When the filtering component 42-4 is used, the filtering component 42-4 filters the unipolar square-wave second power source V2 into a pulsating-DC-wave second power source V2 and provides the pulsating-DC-wave second power source V2 from the second output side 42-2 to the first input side 24-1 and the inverter unit 44. The inverter unit 44 inverts the pulsating-DC-wave second power source V2 into a sine-wave second output power source Vo2 and provides the sine-wave second output power source Vo2 to the output end 100-2. Therefore, the filtering component 42-4 of the second DC conversion unit 42 is used to increase the overall efficiency of the uninterruptible power supply 100.

Figure 3B:
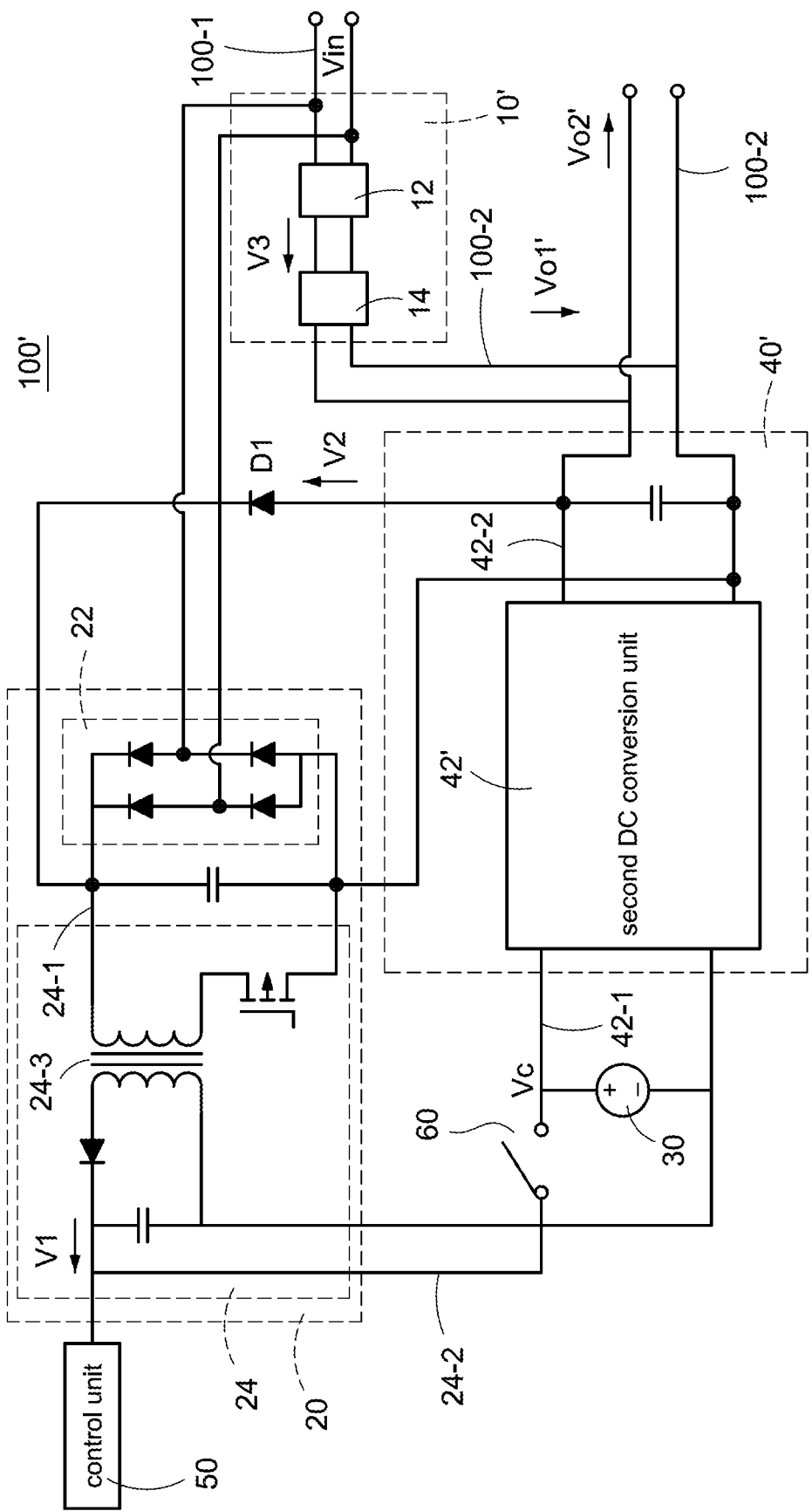
FIG. 3B is a circuit diagram of the uninterruptible power supply according to a second embodiment of the present disclosure.

Please refer to FIG. 3B, which shows a circuit diagram of the uninterruptible power supply according to a second embodiment of the present disclosure, and also refer to FIG. 2-FIG. 3A. In one embodiment, the uninterruptible power supply 100 is an AC-in/DC-out uninterruptible power supply, and the switching unit 10' is an AC-to-DC converter. When the input power source Vin is available, the switching unit 10' converts the input power source Vin into the first output power source Vo1' and provides the first output power source Vo1' to the load 200 through the output end 100-2. When the input power source Vin is not available, the switching unit 10' does not work so that the energy storage power source Vc provided from the energy storage unit 30 is converted by the conversion unit 40' into the second output power source Vo2' to supply the load 200 through the output end 100-2.

The switching unit 10' includes a second rectifying unit 12 and a third DC conversion unit 14. One end of the second rectifying unit 12 is coupled to the input end 100-1 and the other end of the second rectifying unit 12 is coupled to one end of the third DC conversion unit 14, and the other end of the third DC conversion unit 14 is coupled to the output end 100-2. When the input power source Vin is available, the second rectifying unit 12 rectifies the input power source Vin into a third power source V3, and the third DC conversion unit 14 converts the third power source V3 into the first output power source Vo1' and provides the first output power source Vo1' to the output end 100-2. It is to be noted that the type of the third DC conversion unit 14 is not limited, i.e., a DC converter known in the art should be included in the scope of the present disclosure.

The conversion unit 40' includes a second DC conversion unit 42'. The second DC conversion unit 42' has a second input side 42-1, a second output side 42-2, and a second transformation component 42-3. The second input side 42-1 is coupled to the energy storage unit 30, and the second output side 42-2, i.e., the third end of the conversion unit 40 shown in FIG. 1, is coupled to the output end 100-2 and the first input side 24-1 of the first DC conversion unit 24. The second transformation component 42-3 is coupled between the second input side 42-1 and the second output side 42-2 to convert the electricity energy from the second input side 42-1 to the second output side 42-2 in an electromagnetic coupling manner. When the input power source Vin is not available, the second DC conversion unit 42' converts the energy storage power source Vc into the second power source V2, and provides the second power source V2 to the first input side 24-1 through the second output side 42-2. The second DC conversion unit 42' takes the second power source V2 as the second output power source Vo2' and provides the second output power source Vo2' to the output end 100-2 for supplying the required electricity to the load 200.

It is to be noted that the circuit structure, connection relationship, and control manner of a charging unit 20 not mentioned in this embodiment are the same as those disclosed in FIG. 3A. In one embodiment, the second DC conversion unit 42' is a flyback converter, and its circuit structure and circuit function are the same as those of the first DC conversion unit 24 of the charging unit 20 shown in FIG. 3A. Therefore, different DC converters known in the art should be included in the scope of the present disclosure.

Figure 4:
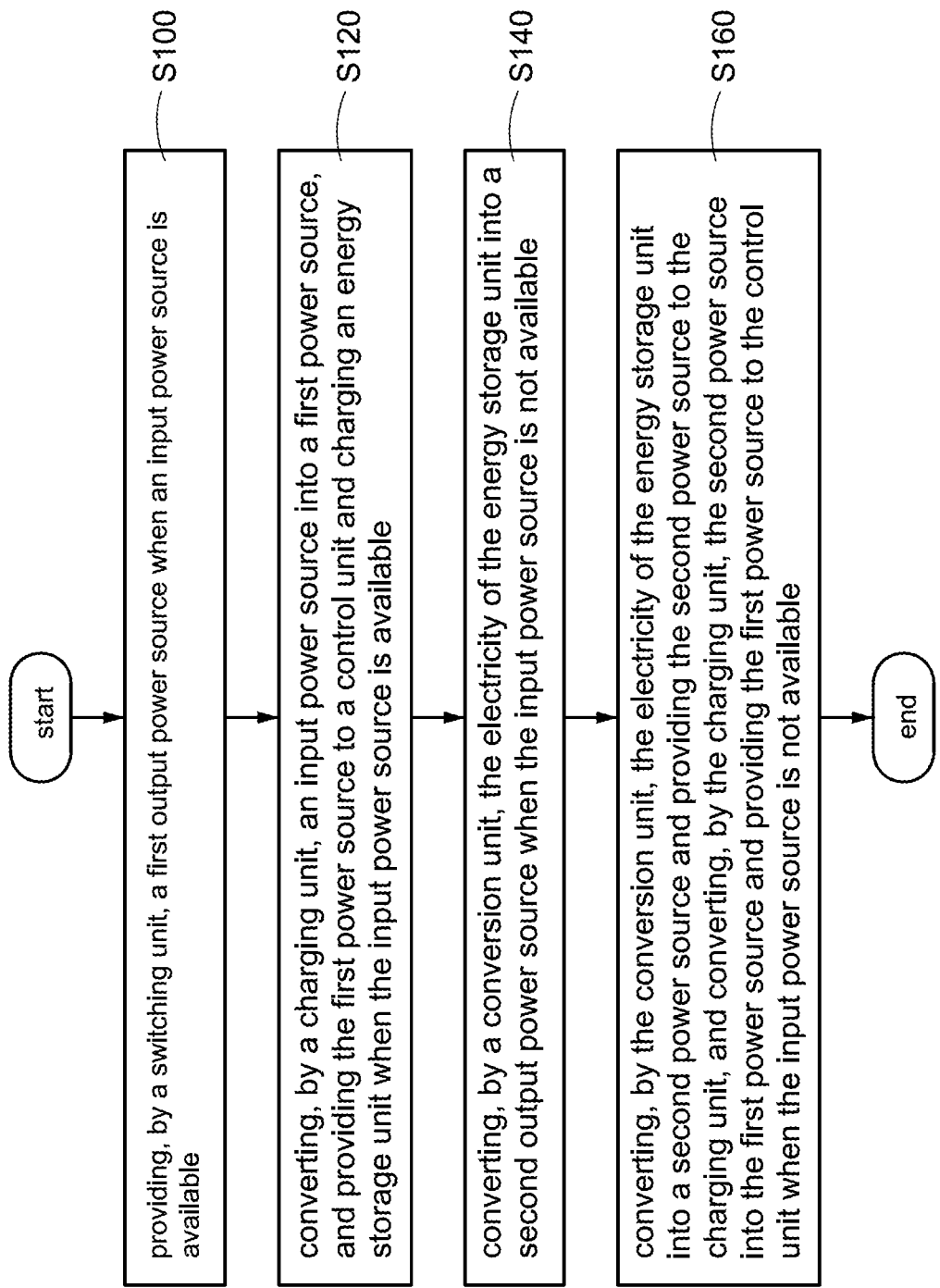
FIG. 4 is a flowchart of a method of operating the uninterruptible power supply according to the present disclosure.

Please refer to FIG. 4, which shows a flowchart of a method of operating the uninterruptible power supply according to the present disclosure, and also refer to FIG. 2-FIG. 3B. The uninterruptible power supply 100 receives an input power source Vin and provides a first output power source Vo1 or a second output power source Vo2 to a load 200. The method of operating the uninterruptible power supply 100 includes the steps as follows. First, when the input power source Vin is available, a switching unit 10 provides a first output power source Vo1 (S100). When the uninterruptible power supply 100 is an AC-in/AC-out uninterruptible power supply and the input power source Vin is available, the switching unit 10 is turned on so that the input power source Vin is the first output power source Vo1, and the input power source Vin is provided to the load 200 through an output end 100-2. When the uninterruptible power supply 100' is an AC-in/DC-out uninterruptible power supply and the input power source Vin is available, the switching unit 10' converts the input power source Vin into a first output power source Vo1' and provides the first output power source Vo1' to the load 200 through the output end 100-2.

Afterward, when the input power source Vin is available, a charging unit 20 converts the input power source Vin into a first power source V1 and provides the first power source V1 to a control unit 50 and to charge an energy storage unit 30 (S120). The charging unit 20 includes a first rectifying unit 22 and a first DC conversion unit 24. After the first rectifying unit 22 rectifies the input power source Vin, the rectified input power source Vin is provided to a first input side 24-1 of the first DC conversion unit 24. The first DC conversion unit 24 converts the rectified input power source Vin into the first power source V1 and outputs the first power source V1 through a first output side 24-2. When the input power source Vin is available, the first DC conversion unit 24 converts the rectified input power source Vin into the first power source V1 and outputs the first power source V1 through the first output side 24-2. The first power source V1 is provided to the control unit 50 through the first output side 24-2 and provided to charge the energy storage unit 30 through the switch unit 60.

Afterward, when the input power source Vin is not available, a conversion unit 40 converts the electricity of the energy storage unit 30 into a second output power source (S140). When the uninterruptible power supply 100 is an AC-in/AC-out uninterruptible power supply and the input power source Vin is not available, a second DC conversion unit 42 converts an energy storage power source Vc provided from the energy storage unit 30 into a second power source V2, and provides the second power source V2 to the first input side 24-1 and an inverter unit 44 through a second output side 42-2. The inverter unit 44 inverts the second power source V2 into the second output power source Vo2 and provides the second output power source Vo2 to the load 200 through the output end 100-2. When the uninterruptible power supply 100' is an AC-in/DC-out uninterruptible power supply and the input power source Vin is not available, a second DC conversion unit 42' converts the energy storage power source Vc into the second power source V2, and provides the second power source V2 to the first input side 24-1 through the second output side 42-2. The second DC conversion unit 42' takes the second power source V2 as the second output power source Vo2' and provides the second output power source Vo2' to the output end 100-2 for supplying the required electricity to the load 200.

Finally, when the input power source Vin is not available, the conversion unit 40 converts the electricity of the energy storage unit 30 into the second power source V2, and provides the second power source V2 to the charging unit 20; the charging unit 20 converts the second power source V2 into the first power source V1, and provides the first power source V1 to the control unit 50 (S160). When the input power source Vin is not available, the first DC conversion unit 24 converts the second power source V2 into the first power source V1 and outputs the first power source V1 through the first output side 24-2. The first power source V1 is provided to the control unit 50 through the first output side 24-2.

In conclusion, the present disclosure has following features and advantages:

1. The objective of the present disclosure is to commonly use the conversion circuit of the charging unit under the operation of the uninterruptible power supply according to the coupled relationship between the first input side of the charging unit and the second output side of the conversion unit so as to save circuits which are coupled between the charging unit and the control unit of the uninterruptible power supply in the related art, thereby achieve the cost reduction and volume reduction thereof.

2. The switch unit is turned on when the input power source is available and the switch unit is turned off when the input power source is not available so that the energy storage power source outputted from the energy storage unit does not flow back to the energy storage unit, and therefore unnecessary electricity waste can be avoided.

3. The isolation transformer with electrical isolation between the primary side and the secondary side thereof is used to protect the user manipulating the uninterruptible power supply.

4. The filtering component of the conversion unit is provided to filter the unipolar square-wave second power source into the pulsating-DC-wave second power source, thereby increasing the overall efficiency of the uninterruptible power supply.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An uninterruptible power supply comprising an input end configured to receive an input power source and an output end coupled to a load, the uninterruptible power supply comprising:
   a switching unit coupled to the input end and the output end,
   a charging unit coupled to the input end,
   an energy storage unit coupled to the charging unit,
   a conversion unit coupled to the charging unit, the energy storage unit, and the output end, and
   a control unit coupled to the charging unit,
   wherein when the input power source is available, the switching unit is configured to switch the input power source into a first output power source and provide the first output power source to the output end, and the charging unit is configured to convert the input power source into a first power source and provide the first power source to the control unit and to charge the energy storage unit; when the input power source is not available, the conversion unit is configured to convert the electricity of the energy storage unit into a second output power source and provide the second output power source to the output end, and the conversion unit is configured to provide a second power source to the charging unit and the charging unit is configured to convert the second power source into the first power source and provide the first power source to the control unit.

2. The uninterruptible power supply of claim 1, further comprising:
   a switch unit coupled to the charging unit and the energy storage unit.

3. The uninterruptible power supply of claim 1, wherein the charging unit comprises:
   a first rectifying unit coupled to the input end, and
   a first DC conversion unit comprising a first input side and a first output side, wherein the first input side is coupled to the first rectifying unit and the first output side is coupled to the energy storage unit.

4. The uninterruptible power supply of claim 3, wherein the conversion unit comprises:
   a second DC conversion unit comprising a second input side and a second output side, wherein the second input side is coupled to the energy storage unit, and
   an inverter unit coupled to the second output side and the output end.

5. The uninterruptible power supply of claim 4, wherein the second DC conversion unit comprises:
   a filtering component coupled to the second output side and configured to filter the second power source.

6. The uninterruptible power supply of claim 3, wherein the conversion unit comprises:
   a second DC conversion unit comprising a second input side and a second output side, wherein the second input side is coupled to the energy storage unit and the second output side is coupled to the output end.

7. The uninterruptible power supply of claim 3, wherein the switching unit comprises:
   a second rectifying unit coupled to the input end, and
   a third DC conversion unit coupled to the second rectifying unit and the output end.

8. The uninterruptible power supply of claim 1, wherein the control unit comprises:
   an isolation transformer coupled to the charging unit,
   a communication unit coupled to the isolation transformer, and
   a controller coupled to the charging unit.

9. A method of operating an uninterruptible power supply, the uninterruptible power supply configured to receive an input power source and provide a first output power source or a second output power source to a load, and the uninterruptible power supply comprising a switching unit, a charging unit, an energy storage unit, a conversion unit, and a control unit, the method comprising the steps of:
   switching, by the switching unit, the input power source into the first output power source when the input power source is available,
   converting, by the charging unit, the input power source into a first power source and providing the first power source to the control unit and to charge the energy storage unit when the input power source is available,
   converting, by the conversion unit, the electricity of the energy storage unit into a second output power source when the input power source is not available, and
   converting, by the conversion unit, the electricity of the energy storage unit into a second power source and providing the second power source to the charging unit, and converting, by the charging unit, the second power source into a first power source and providing the first power source to the control unit when the input power source is not available.

10. The method of operating the uninterruptible power supply of claim 9, wherein the uninterruptible power supply further comprises a switch unit coupled to the charging unit and the energy storage unit;
    wherein when the input power source is available, the switch unit is turned on to make the first power source charge the energy storage unit; when the input power source is not available, the switch unit is turned off to make the first power source fail to charge the energy storage unit.

11. The method of operating the uninterruptible power supply of claim 9, wherein the charging unit comprises a first rectifying unit and a first DC conversion unit;

wherein the first rectifying unit and the first DC conversion unit are configured to convert the input power source into the first power source, or the first DC conversion unit is configured to convert the second power source into the first power source.

12. The method of operating the uninterruptible power supply of claim 9, wherein the conversion unit comprises a second DC conversion unit and an inverter unit;

wherein the second DC conversion unit is configured to convert the electricity of the energy storage unit into the second power source, and the inverter unit is configured to convert the second power source into the second output power source.

13. The method of operating the uninterruptible power supply of claim 9, wherein the conversion unit comprises a second DC conversion unit;

wherein the second DC conversion unit is configured to convert the electricity of the energy storage unit into the second power source to make the second power source be the second output power source.

14. The method of operating the uninterruptible power supply of claim 13, wherein the switching unit comprises a second rectifying unit and a third DC conversion unit;

wherein when the input power source is available, the second rectifying unit is configured to rectify the input power source into a third power source, and the third DC conversion unit is configured to convert the third power source into the first output power source.

* * * * *